March 19, 1940.   L. V. CASTO ET AL   2,193,900

WORK SURFACING MECHANISM

Original Filed Nov. 2, 1936   6 Sheets-Sheet 1

INVENTORS
LLOYD V. CASTO,
GUIDO VON WEBERN,
EDWARD W. HAMANT, and
Orville D. KING
BY
Bates, Golrick & Teare
ATTORNEYS

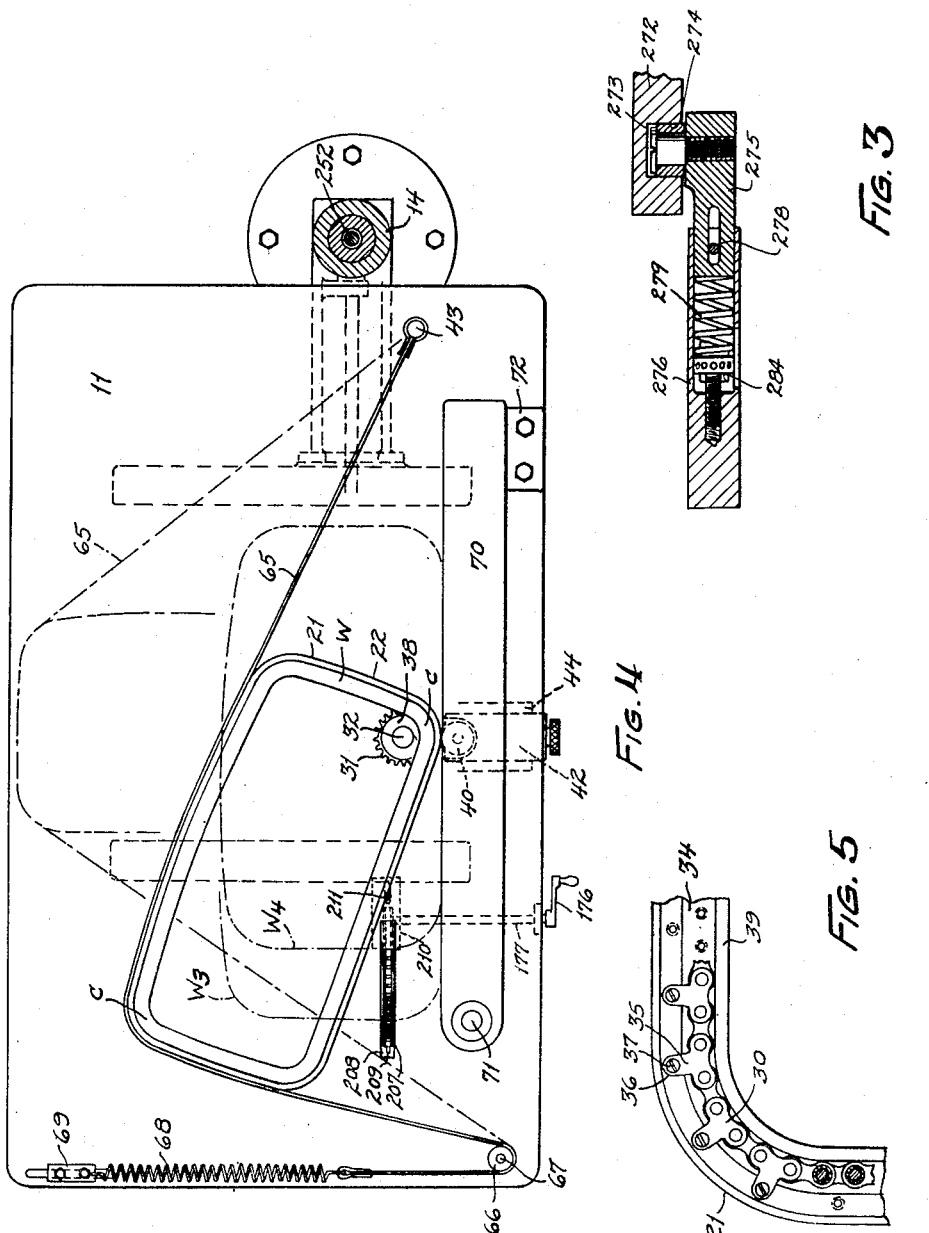

INVENTORS
LLOYD V. CASTO,
GUIDO VON WEBERN,
EDWARD W. HAMANT, and
ORVILLE D. KING
BY Bates, Golrick, & Teare
ATTORNEYS Patented Mar. 19, 1940

2,193,900

UNITED STATES PATENT OFFICE 2,193,900

WORK SURFACING MECHANISM

Lloyd V. Casto, Detroit, Mich., and Guido von Webern, Edward William Hamant, and Orville Doering King, Dayton, Ohio, assignors to Oxford Varnish Corporation, Detroit, Mich., a corporation of Michigan Original application November 2, 1936, Serial No. 108,698. Divided and this application September 4, 1937, Serial No. 162,534

5 Claims. (Cl. 90—11)

This application is a continuation in part of our application, Serial No. 38,358, filed August 29, 1935, and a division of our application Serial No. 108,698, filed November 2, 1936 which applications became Patents Nos. 2,096,730 and 2,096,731 on the 26th day of October, 1937. The invention relates to a work-treating machine; the examples shown being for effecting surfacing operations on articles of manufacture, and, specifically, abrading or otherwise cutting or resurfacing of objects such as frames for windows etc.

The general object is to provide an improved machine of the type above indicated.

A further object is to provide an improved machine for surfacing objects such as frames or, generally, articles having portions which extend at an angle to each other connected by a curved portion, wherein the surfacing operation may be effected continuously from one such portion to others.

A further object is to provide an improved arrangement for presenting work, such as frame stock, to a surfacing tool.

A further object is to provide an improved means for steadying a frame or the like while moving it in its principal plane in presenting all the desired surface portions to a tool.

A further object is to provide an improved tool-supporting head, which may be operated to present a tool or tools in a great variety of selected relationships to the work.

Still another object is to provide a work treating machine which will operate automatically and continuously on work having portions extending at an angle to each other connected by a curve.

Other objects and features of the invention will become apparent from the following description relating to the accompanying drawings, showing preferred arrangements. The essential novel characteristics are summarized in the claims.

Figure 1:
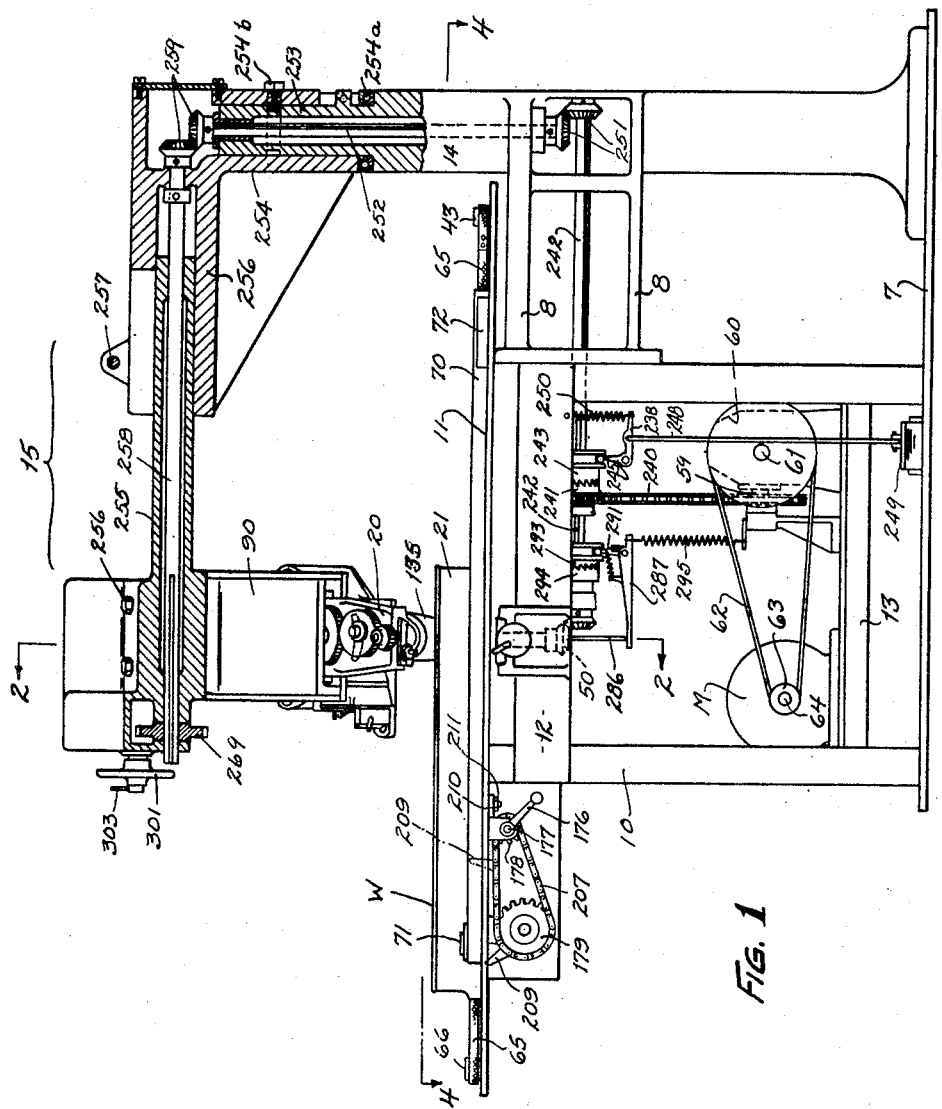
Figure 2:
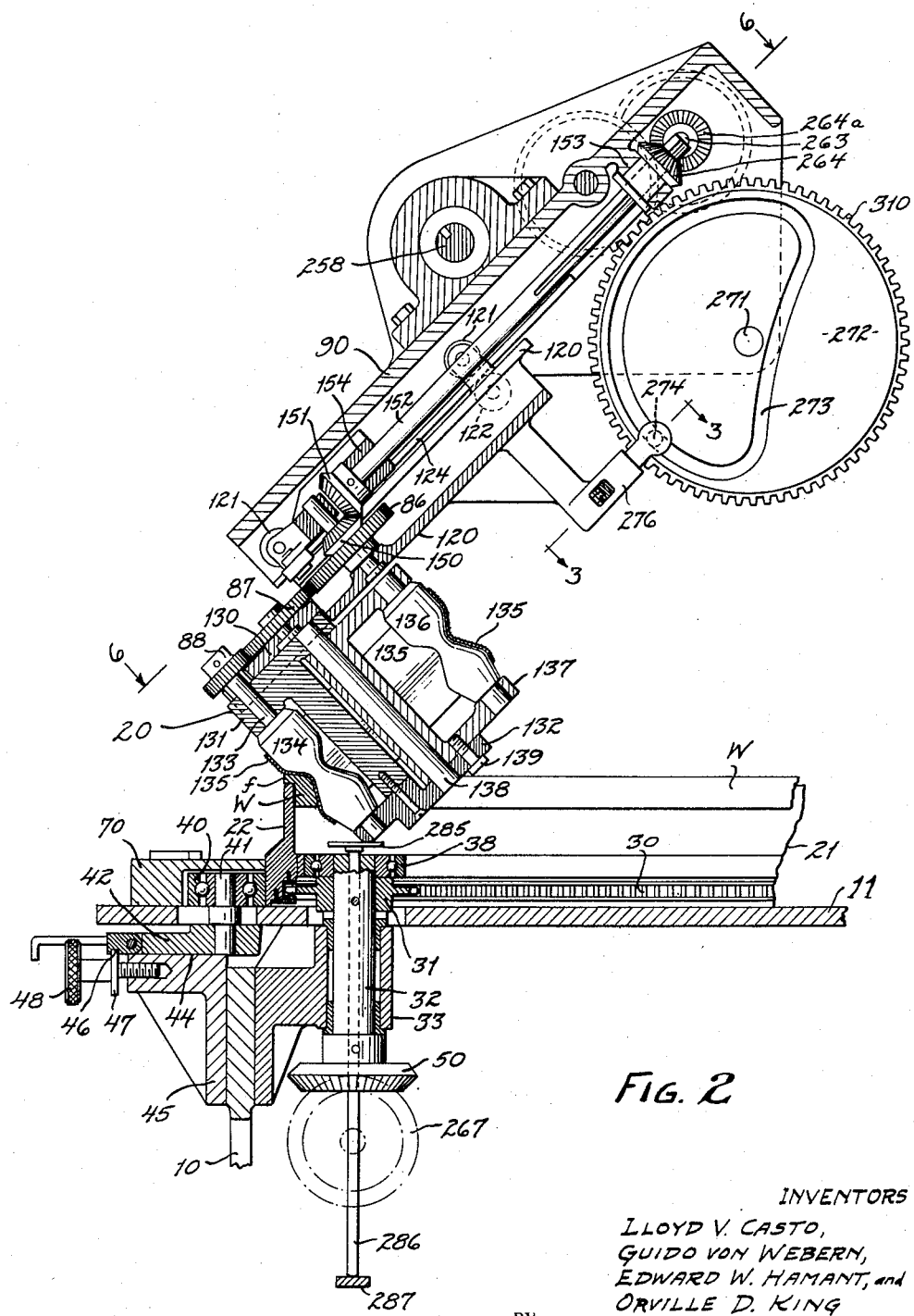
Figure 6:
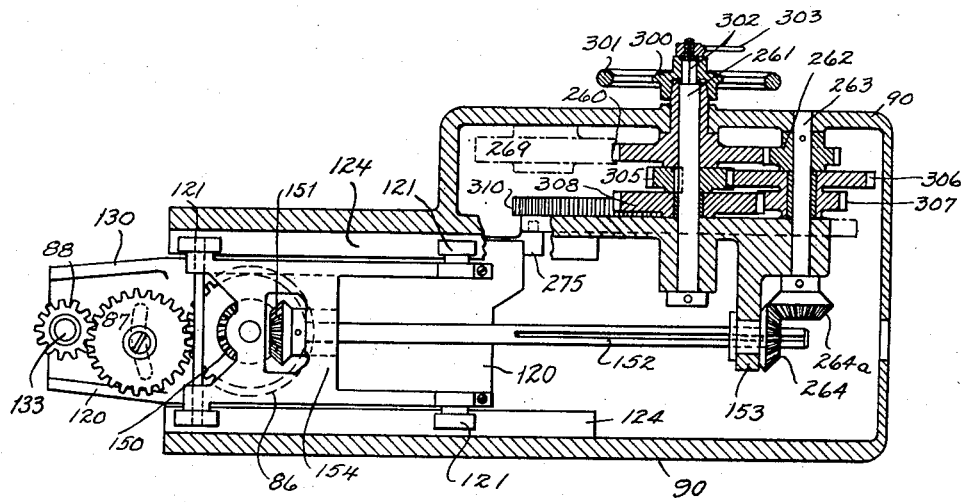
Figure 7:
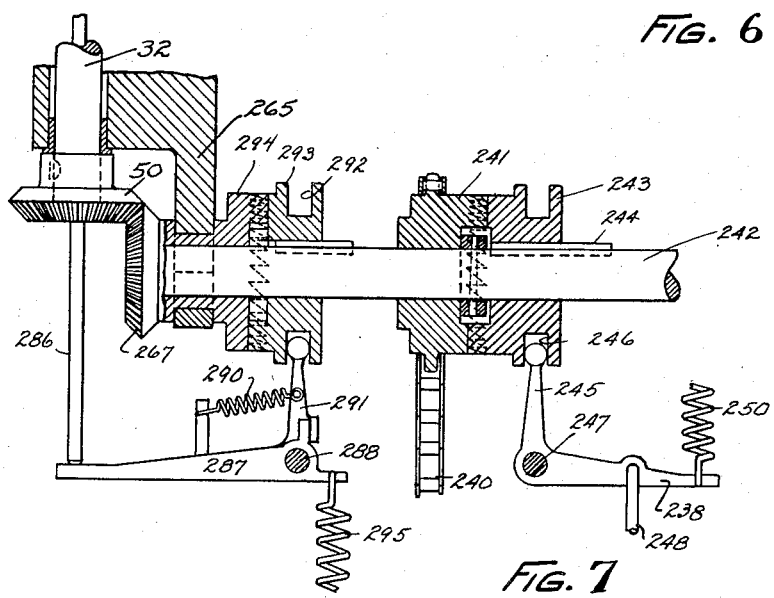
Figure 8:
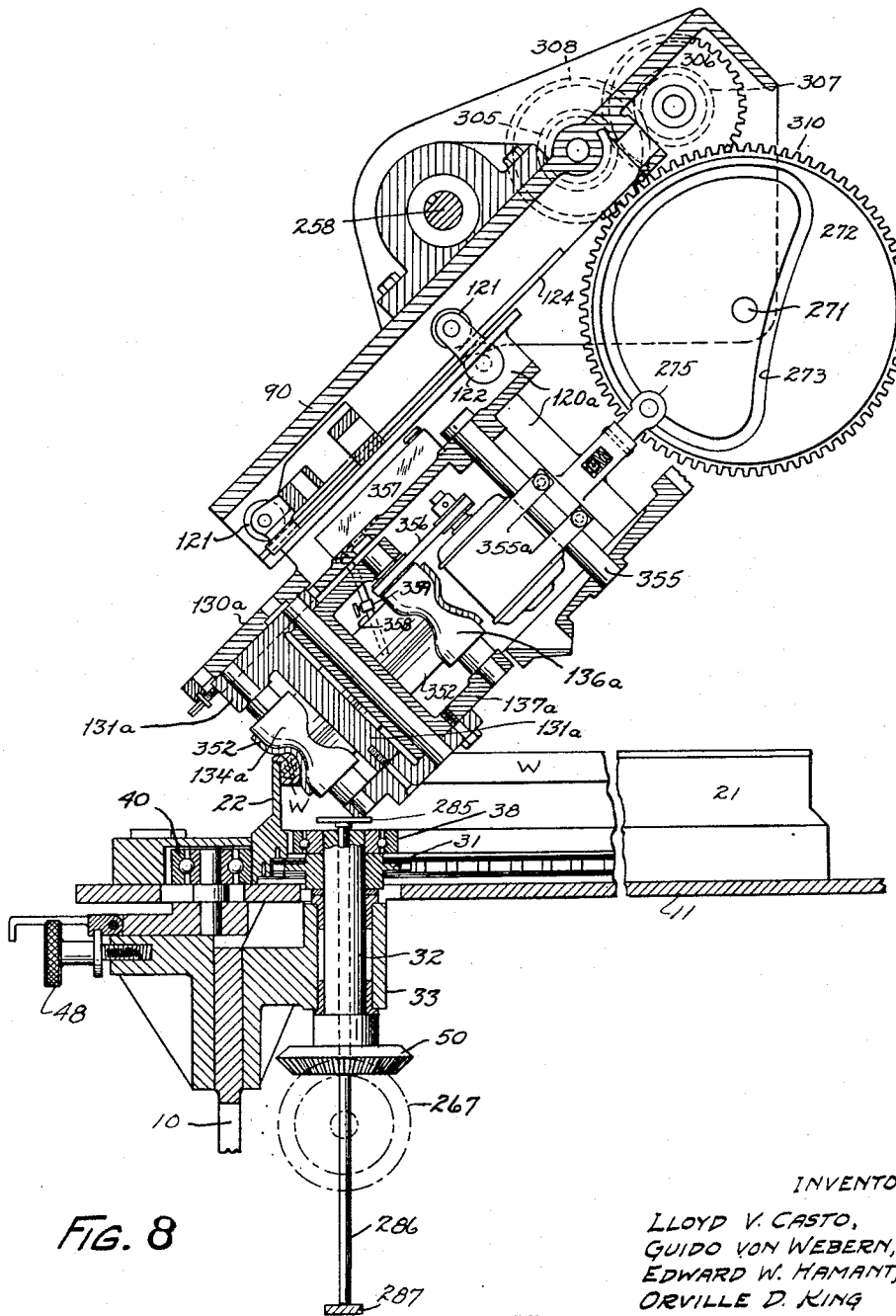
Figure 9:
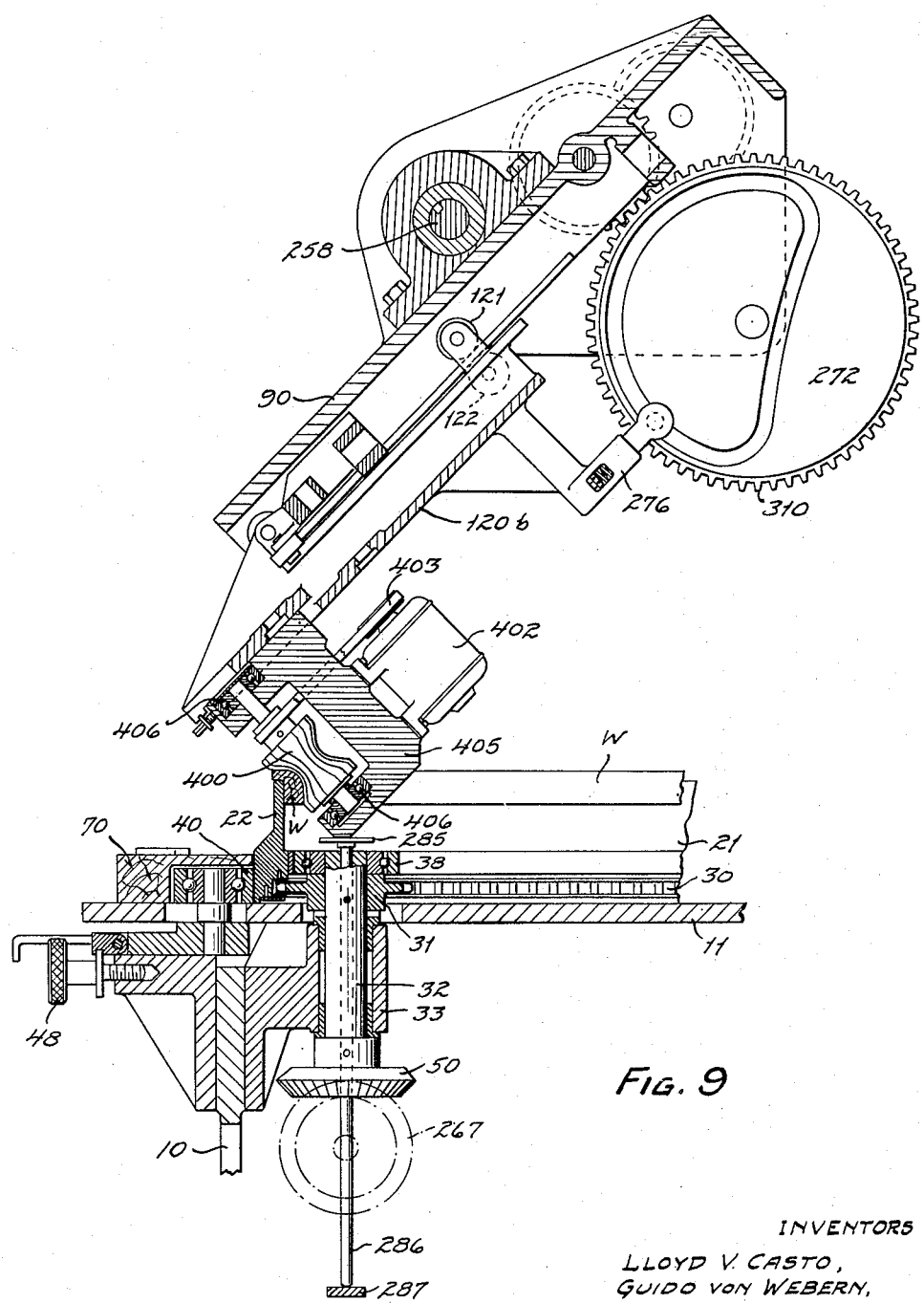

Referring to the drawings, Fig. 1 is a side elevation of the machine, upper tubular housing portions for drive shafts being broken away in central longitudinal section with respect to the axes of the shafting; Fig. 2 is a transverse fragmentary sectional view, taken substantially along the line 2—2 on Fig. 1; Fig. 3 is a detail sectional view, taken substantially along the line 3—3 on Fig. 2; Fig. 4 is a sectional plan view of a work-supporting table, as indicated by the lines 4—4 on Fig. 1; Fig. 5 is a bottom plan view of a corner portion of a workholder; Fig. 6 is a sectional plan view, showing a driving mechanism adapted for use with one form of tool, the plane of the section being indicated by the line 6—6 on Fig. 2; Fig. 7 is a fragmentary, central sectional view in a vertical plane of clutching mechanism, shown also in Fig. 1; Fig. 8 is a view similar to Fig. 2, showing a modified form of tool drive, and Fig. 9 is also a view similar to Fig. 2, showing another form of tool and modified driving means therefor.

General arrangement

Referring first to the mechanism shown in Figs. 1 to 7, inclusive, and first to Figs. 1 and 2, a base or supporting framework for the mechanism is shown at 10, provided with a bed or table 11. One side portion only of the supporting framework is shown, namely, the front side, and this may be duplicated by similar framework at the back of the machine. The uprights of the frame are cross-braced and connected by members such as 12 and 13, one of each being shown. Secured to the frame 10, at the right, as shown in Fig. 1, and rising thereabove is a column 14 supporting a super-structure indicated generally at 15. The frame 10 and the column 14 may rest on a common base plate 7, and the column may be connected additionally to the framework 10 as by a bracket structure 8. The table 11 supports the work indicated at W, and the super-structure 15 supports a work-decorating mechanism proper, which is indicated generally at 20 and carried on a depending heavy arm or bed 90 of the super-structure.

Work supporting mechanism

The table, together with the work supporting mechanism is best shown in Figs. 1, 2, 4 and 5. As there shown, the table has a generally planular top surface 11, which supports a workholding fixture 21 in such manner that the fixture is free to swing in controlled directions, depending upon the shape of the work. The workholder is preferably positively driven for presenting various portions of the work, successively to the tool. For illustrative purposes only, the machine is shown as adapted for altering the surface characteristics of a continuous or endless frame member, which is open at its central region, has substantially the same cross-section throughout its extent and has curved corner portions c connecting the side and end members. This work will be referred to as a "frame". It may be of wood or any other material.

As shown in the drawings (see Fig. 2), the frame W has a continuous flange effect f which rests on an upstanding substantially continuous flange 22 on the workholder. The flange 22 may loosely embrace the main body portion of the frame below the flange effect f, in the event it is desired to allow the work to float slightly on the holder. Any suitable arrangement tending to minimize friction between the workholder 21 and the table may be used, such, for example, as inset steel balls (not shown) on the underside of the fixture.

Workholder and driving means for it

The work holder 21 is moved positively or slid across the surface of the table 11, in presenting the different portions of the work to the tool. As indicated in Figs. 2 and 5, particularly, the workholder is provided with a rack 30, arranged to be engaged by a sprocket wheel 31, drivingly supported by a shaft 32, mounted in a frame bracket 33 on a portion of the framework 10. The drive for the shaft 32 will later be described. The rack preferably comprises a continuous roller chain, carried in an angular recess 34, formed in the inner wall of the workholder. Certain links 35 of the roller chain are provided with outwardly extending lugs 36 (see Fig. 5), which are secured to the workholder as by studs 37 to secure the chain in fixed position on the workholder.

The work carried by the workholder is maintained in cooperative relationship with the surfacing unit 20, by a pair of rollers 38 and 40, positioned respectively inside and outside of the workholder and bearing thereon. The roller 38 is supported on the upper end of the shaft 32, beyond the sprocket 31, and the roller 40 is carried on a spindle 41, on a bracket 42, attached to the frame 10.

The bracket 42, which supports the roller 40, is movable to permit the workholder to be readily replaced, as well as to permit adjustment of the pressure of the rollers on the workholder. As indicated in Fig. 2, the bracket 42 is slidable in a guideway 44 on a bracket member 45 of the frame 10. The outermost end of the bracket 42 has a groove 46, engaged by an annular flange 47 of an adjusting screw 48 threaded into the bracket member 45 for adjustment toward and away from the roller 38.

The sprocket 31 is positively driven to progress the work. To this end the shaft 32 to which the sprocket 31 is secured, is provided with a bevelled gear 50, below the bracket 33. The bevel gear is in constant mesh, (see Fig. 7) with another bevel gear 267, drivingly secured to a driving member 294 loose on a horizontal shaft 242. The shaft 242 may be journalled in any suitable brackets beneath the table. For example, one end of the shaft may be carried by a depending portion 265 of the bracket 33, as shown in Fig. 7. The member 294 is one member of a jaw clutch, the other member 293 of which is splined to the shaft 242 to enable the shaft to drive the bevel gearing.

The shaft 242 (Figs. 1 and 7), has a sprocket 241 adapted to be coupled therewith by another jaw clutch including parts 242, 243 and 244. The sprocket is connected by a drive chain 240, with the driving shaft 59 of a speed reduction gear unit 60. The driven shaft 61 of said unit is drivingly connected, as by a belt 62, with a pulley 63, carried by the armature shaft 64 of a motor M, on the lower cross-framings part of which is shown at 13. The manner of controlling the clutches will be described later.

Workholder (continued)

Referring now to Fig. 4, illustrating a plan view of the table and workholder, it will be noted that as the sprocket 31 progresses the workholder, the latter will swing or rock about the axis of the sprocket and that, when the sprocket passes from one relatively straight internal surface of the workholder to another such surface, those portions of the workholder remote from the sprocket will travel faster than when the workholder progresses substantially in a straight line.

At times, during the change in the rate of travel, the workholder is apt to leave the surface of the table 11. Since this would cause the tool to form a relatively distorted surface on the work, and tend to damage various parts of the progressing mechanism, there is provided a mechanism to coact with the workholder and maintain it in contact with the table 11. For this purpose a flexible belt 65 is secured to a post 43 at the right-hand end of the table 11, Fig. 4. The belt wraps partially about and frictionally engages the external surface or surfaces of the workholder parallel to the table, and passes forwardly from the workholder around a pulley 66, journalled on a stud 67, carried by the table and thence rearwardly to a spring 68, which is adjustably secured to the table by a block 69. This arrangement, due to the frictional engagement between the belt and the surface of the workholder, and the constant pressure of the belt on the workholder causes the workholder to progress smoothly and evenly.

To retard the movement of the workholder, as a surface thereof swings into a position parallel with the foremost edge of the table 11, and to maintain such workholder surface substantially parallel with the front edge of the table (except during such time as the workholder is swinging around the axis of the shaft 32 to enable a surfacing or forming operation to be effected on the corner portions of the work), the table is provided with an abutment 70. As shown in Fig. 4, the abutment 70 comprises an elongated block, preferably of wood, which is pivotally mounted at its extreme left-hand end on a stud 71, carried by the table, and its right-hand end abuts a resilient cushion, such, as for instance, a rubber block 72.

In the event it is desired to start operation on the individual workpieces in identical respective positions, this may be effected by means of the positioning mechanism shown on Figs. 1 and 4. In these figures there is shown a crank 176 secured to a shaft 177, suitably journalled on the frame or beneath the table 11. On its inner end, the shaft 177 carries a sprocket wheel 178. At the left of the sprocket 178, Fig. 1 is another sprocket 179, and a chain 207 passes about the sprockets, so that the upper stretch of the chain is parallel with the table and directly beneath it, in line with a slot 208 in the table. The chain has a lug 209, projecting upwardly through the slot, in position to engage the end of the workholder and progress it, together with the work, toward the right, Fig. 4, as from the broken line position W3 to the position W4. In the latter position, the lug is arrested by a stop 210 adjustably positioned on the table 11, as by a bolt 211. The movement of the workholder, as driven by the sprocket 31, returns the chain lug to initial position at the left-hand end of the slot 208, at which position it retracts into the slot to get out of the way of the workholder.

Surfacing unit mounting

The unit 20 overhangs the table 11, and is so mounted as to permit it to be adjusted relative to the table 11 in a variety of ways, so that the different surface portions of the work may be presented to the tool or tools and so that the tools may approach the work at various desired angles. As shown in Figs. 1 and 2, the unit 20 is guided for raising and lowering movement on the arm 90. This, in turn, is mounted on a hollow shaft 255, carried by a bracket 256, a hollow depending portion 254 of which is mounted for rotational adjustment in telescoping relation to an upper reduced tubular end portion 253 of the column 14. The arm 90, is arranged to rock about the axis of the horizontally extending hollow shaft 255, which may be secured in angularly adjusted position relative thereto by a clamping arrangement, the clamping bolt of which is shown at the top in Fig. 1, at 257. The clamping arrangement also permits the entire surfacing mechanism to be moved toward and away from the column 14.

The surfacing unit is also swingable about the column, by reason of the telescoping connection between the bracket portion 254 and column portion 253. As shown, the lower end of the hollow portion 254 of the bracket rests on an anti-friction bearing 254a, supported by the relatively enlarged portion of the column, so that the unit may be easily swung. When swung as aforesaid, into the properly adjusted position, the unit-supporting arm members may be locked, as by a set screw 254b on the bracket portion 254, the inner end of which seats in an annular channel in the reduced portion 253 of the column 14.

The tool-supporting unit 20, mounted as stated above on the arm 90, may be moved toward and away from the table 11 in a direction tangential to the hollow shaft 255, thus permitting the unit to be moved substantially universally relative to the table, whereby workpieces of various sizes and shapes may be operated upon conveniently, and also to permit the unit to be adjusted relative to the work to vary the depth of cut, angle of approach, etc.

Surfacing unit (tool head)

The tool supporting unit 20 is mounted on a frame 120, which relatively underhangs the supporting arm 90, in the adjusted position of it shown in Fig. 2, and in that position may slide up and down on the arm, there being as shown, a plurality of sets of rollers 121 and 122, one set engaging the top surface of spaced paired gibs 124, and the other engaging the bottom surfaces of said gibs. The gibs extend inwardly from the opposite sides of the arm member 90, as shown particularly in Fig. 6.

The mechanism forming the unit 20 may be adjusted up and down the arm 90 manually as by a rack and gear, as shown in our prior application 108,698. However, as shown in all modifications hereof, the unit 20 is arranged to be moved automatically toward and away from the work. For instance, as shown in Figs. 2 and 6, the framework 20 is reciprocated by the cam 272 carried on a gear wheel 310 which is supported on a shaft 271 journalled in the arm 90 on appropriate brackets. The cam has a continuous groove or channel 273 in which rests a follower roller 274 and the roller is connected to the frame 120. The drive for the cam gear and details of the cam mechanism will be described later.

Referring further to Figs. 2 and 6, particularly the former, the frame 120 extends outwardly beyond the arm 90 and in spaced relation to its underside, intermediately of the gibs 124, to provide room for a driving mechanism, to be presently described. An end portion 130 of the frame 120 is offset in an upward direction and has fixed thereto a two armed tool-supporting frame or bracket (shown as made in two sections, 131 and 132). In the two arms of the bracket is journalled a shaft 134. This serves to guide and support a tool, which, in the form shown, comprises a continuous strip of flexible material 135 having an abrasive or other suitable working surface. A cooperating rotary guide 136 having a form similar to that of 134 is carried in a two-armed bracket 137, adjustably mounted so as variably to tension the belt. The bracket 137 is pivoted to a shaft 138, secured in the members 131 and 132 in a manner similar to the support for the shaft 134. Tension adjustment on the belt may be maintained by a set screw 139, in the member 132. The screw may operate in a suitable slot (not shown) concentric with the pivot shaft 138.

The character of the guides 134 and 136 varies in accordance with the work. As shown, the central restricted portion of the guide 134 conforms generally to the surface contour of the work W, so as to carry the abrasive surface of the belt 135 uniformly into engagement with the entire region of the work upon which it is desired to operate. As shown, this is the upper and inner surface of the frame member W, constituting the work.

The particular form of the machine shown in Fig. 2, differs from those shown in Figs. 8 and 9 principally in that the tool is driven by the same source of power as operates the workholder, or at least it is arranged to be so driven. Driving connections leading to the clutch shaft 242, which operates the workholder will now be described.

Surfacing unit drive

The upper end of the abrasive belt driving shaft 133 has a gear 88 fixed thereto, meshing with an idler gear 87 on the frame member 130. This, in turn, is driven by a gear 86 on the top side of the frame 120 and supported thereby. The gear 86 has rigid therewith a bevel gear 150 meshing with another bevel gear 151 fixed on a shaft 152 journalled in appropriate bearing brackets such as 153 and 154 fixed to or forming parts of the arm 90 and located on the hollow underside of said arm. On the end of the shaft opposite the gear 151 is a bevel gear 264 which is splined to the shaft and is maintained constantly in position with reference to the arm 90, by the bearing bracket 153, which embraces the hub of the gear 264 at a peripheral groove in said hub. The gear 264 is in constant mesh with a bevel gear 264a on a transversely extending shaft 263, journalled partly in the bracket 153 and partly in a side wall portion of the arm 90. It will be seen that the surfacing unit can be moved up and down on the guides of the arm 90, without disturbing the driving relationship between the tool-supporting shaft or roller 134 and the shaft 263.

Referring again to Fig. 1, it will be seen that the right hand end of the horizontal drive shaft 242, beneath the table, is connected by bevel gears 251 with a vertical shaft 252 supported in appropriate bearings in the column 14; and that the shaft 252 is connected by bevel gearing 259 with a horizontal shaft 258, passing centrally through the relatively adjustable superstructure arms 255 and 256. The shaft 258 is supported at one end in the arm portion 256 in a fixed manner and slidably in an outer portion of the arm member 90, so that the tubular portion 255 of said arm can be adjusted back and forth with respect to the arm 256 of the superstructure. The outer end of the shaft 258 is splined to a gear 259, on bracket portions of the arm 90, as will be obvious from Fig. 1. This gear 259 as shown in Fig. 6 (broken lines), meshes constantly with a spur gear 260 carried on a shaft 261, journalled in the arm 90. Gear 260 meshes with a spur gear 262, fast on the shaft 263, which as already described, drives the bevel gear 264a of the belt driving gearing.

Attachment of the gear 260 to the shaft 261 is through the medium of a conventional conical clamp at the outer end of the shaft. The hub 300 of a hand wheel 301 is secured to the outer end of the shaft at a squared end portion 302 of the shaft; and tightening or loosening of the cone clamp is effected by an end nut 303 beyond the squared end. This permits an operator to turn the shaft 261 independently of the gearing 260, 262, etc., thereby to reciprocate the tool head on the guides of the supporting arm 90.

The cam driving gear wheel 310 is driven at relatively low speed by a system of gearing shown on Fig. 6, including a gear wheel 308 meshing with 310, and other gears 305, 306, and 307, the former being fast on the manually adjustable shaft 261. Gears 306, 307 and 308 are loose on their respective supports.

When the cone connection between shaft 261 and the gear 260 is tight then the tool head or carriage 20 is reciprocated, the abrasive belt 135 is properly driven—likewise the workholder 21—all automatically, by power, and in proper timed relationship. The abrasive belt 135 is driven at the desired speed for abrading or cutting the work W, as in performing a finishing or rough cut operation on it due to the relative speed increase by gears 86 to 88. The gear relationships are such that after the cutting operation has continued throughout the entire length of a workpiece on the workholder, the tool-head will then be raised by the cam.

It is desirable that the abrasive belt be held yieldingly against the work, and the preferred arrangement for effecting this is illustrated particularly in Figs. 2 and 3. The yielding connection includes two telescopically arranged members 275 and 276 which support the cam follower 274. The member 276 is secured to the frame 120 and has a pin and slot connection 278, with the member 275. Interposed between the members 275 and 276 is a compression spring 279. This spring is arranged in such a manner that when the cam rotates to move the decorating unit toward the work, the force is applied through the spring. However, when the cam acts to withdraw the decorating unit from the work, it acts positively through the pin and slot connection between the members 275 and 276.

Automatic work drive

Referring further to Figs. 1, 2 and 7, we have so arranged the machine that as the surfacing unit approaches the work under the influence of the cam 272, power is automatically applied to the sprocket 31 of the work table, to advance the work. The arrangement is such that the sprocket 31 is rotated slightly before the abrasive belt supported on the unit 20 strikes the work, thus insuring progressive operation of the tool on the work at the very start.

As the tool head approaches the work, the bracket member 132 (lowermost portion of tool head) strikes the head 285 of a plunger 286, which is slidably mounted in the hollow shaft 32, which drives the workholder. Continued downward movement of the tool-head, causes the plunger 286 to rock a lever 287, Fig. 7, about its pivot shaft 288, which is supported in any convenient manner on the lower framework of the machine. A lever 291 pivoted loosely on said shaft 288, and which is operated by a spring 290, coacts with an annular groove or recess 292, formed in the clutch member 293, which is splined to the horizontal drive shaft 242, as already described. The downward movement of the rod 286 causes the clutch member 293 to engage clutch teeth on the member 294, which is rigid with the bevelled gear 267 of the workholder drive, thereby initiating the rotation of the workholder drive sprocket 31. A spring 295 (see Figs. 1 and 7) serves normally to maintain the clutch members 293 and 294 disengaged (through appropriate abutments between the two levers), and to return the parts to their normal positions consequent upon movement of the unit 20 away from the work under the influence of the cam 272.

It will be seen that whenever the clutch members 293 and 294 are engaged, the tool head reciprocating cam, the tool driving gearing leading to the belt guides 134 and 136, and the work-progressing mechanism are all intertied, and operate in proper timed relationship. The clutch members 241 and 243 (Fig. 7), simply couple this intertied gearing mechanism with the power drive, through the sprocket chain 240.

As illustrated in Fig. 7, connection and disconnection of the source of power with the shaft 242 is under the control of a pedal-operated lever 238, having an upstanding arm 245 engaging the clutch member 243 at the groove 246 thereof. The lever 238 is normally held by a spring 250 in position to cause engagement of the clutch members 241 and 243. An operating link 248 extends downwardly to a suitable treadle 249, on the base plate 7 (Fig. 1) so that the operator can render the machine idle at any time by disconnecting the motor from the horizontal drive shaft 242. The abrasive belt remains in operating relation to the work until the operator releases the treadle.

Modification Figure 8

In connection with this modification, the driving mechanism for the workholder and the tool-head reciprocating cam, is essentially the same as previously described. The parts are similarly numbered. The main framework of the carriage 120a is modified to the extent that this has parallel spaced side (or top and bottom) portions which carry between them a supporting shaft 355 for an electric motor 355a positioned between the two sides of the frame. The motor 355a has a belt drive 356, to a pulley effect on one end of the supporting roller 136a for a flexible abrasive belt 352. The other guide roller, 134a, is supported in a manner similar to that previously described for the member 134 (Fig. 2) but is not positively driven. A two-armed bracket 137a supports the drive shaft for the guide 136a of the belt. A bracket 131a is adjustably carried on a portion 130a of the tool head frame for supporting the lower guide 134a for the belt.

The arrangement shown enables the flexible abrasive belt to be used for operation at any desired speed, depending upon the speed control of the motor. An abrasive or other compound may be contained in a reservoir 357 having an outlet pipe 358 positioned with its discharge orifice in association with the active surface of the belt, there being a manual control valve 359 for releasing and blocking the compound.

Modification Figure 9

In this arrangement a different type of tool is shown, enabling considerable simplification of the tool-head. This mechanism is also adapted to be utilized, not only for peripheral surface contour changes, but also cross-sectional contour changes. The peripheral surface contour may be determined by the contour of the workholder which guides the work, relative to the decorating unit, while the cross-sectional contour may be controlled by the shape of the working tool. A cutting tool 400 is shown as carried by the frame 120b of the tool carriage, which is modified principally to the extent of leaving off the arrangement for supporting an upper belt-guiding roller. In other words, the same arrangement as shown in Fig. 2 or 9 may be used, and the supports for the tool 400 put on in place of the belt guides or supports previously described. An electric motor 402 is shown as connected to the cutting tool by a driving belt 403, which reaches around opposite sides of a U-shaped bracket 405, the arms of which carry suitable anti-friction bearings 406 for the shaft which supports the tool 400. Other portions of the mechanism are as shown either in Fig. 2 or 8.

We claim:

1. In a work surfacing machine, a frame having a work table, an arm on the frame projecting over the table, said arm having a portion depending toward the table, a carriage guided for reciprocating movement on said depending portion, means to raise and lower the carriage, a tool adapted to cut work on the table with a rotary motion and power means on the carriage independent of said means for driving the tool.

2. Mechanism according to claim 1 wherein the tool comprises a toothed metallic cutter having an antifrictional support on the carriage, and the power means comprises a motor mounted on the carriage above the cutter and drivingly connected therewith.

3. In a work cutting machine, a work supporting surface, a power-operated mechanism to advance the work, a work cutting mechanism adapted and arranged to remove portions of the work as the work is advanced, an independent driving means to operate said cutting mechanism, said cutting mechanism and the driving means therefor being mounted for movement toward and from the work, and means to initiate the advance of the work automatically consequent upon the movement of the cutting mechanism toward the work.

4. In a work cutting machine, a work supporting surface, power-operated mechanism to advance the work, a work cutting mechanism adapted and arranged to remove portions of the work as the work is advanced, an independent driving means to operate said cutting mechanism, said cutting mechanism and the driving means therefor being mounted for movement toward and from the work, and means to stop the work advancing means automatically consequent upon the movement of the cutting mechanism from the work.

5. In a work cutting machine for cutting the surface of work pieces of each of which has at least two surfaces joined by a curvilinear surface, comprising a planular supporting surface for the work, a comparatively straight surfaced elongated abutment pivoted at one end to said supporting surface and resiliently supported at the other end for movement in a plane parallel with the work supporting surface, means acting on the work to retain it in contact with said abutment, power-operated means to advance the work by advancing one straight surface thereof along said abutment and swinging the other straight surface into contact with said abutment while maintaining constant contact between said abutment and at least one point of the work, and a work cutting mechanism arranged and adapted to remove portions of the work as it progresses along said abutment and power operated means independent of the work advancing means to operate the cutting mechanism.

LLOYD V. CASTO.
GUIDO von WEBERN.
ORVILLE DOERING KING.
EDWARD WILLIAM HAMANT.